(12) United States Patent
Huang

(10) Patent No.: US 8,613,539 B2
(45) Date of Patent: Dec. 24, 2013

(54) COMPUTER BEZEL WITH LIGHT-GUIDE STRUCTURE

(75) Inventor: Fu-Kuo Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/457,552

(22) Filed: Apr. 27, 2012

(65) Prior Publication Data
US 2013/0051063 A1 Feb. 28, 2013

(30) Foreign Application Priority Data

Aug. 31, 2011 (TW) .................................. 100131197

(51) Int. Cl.
*F21V 7/04* (2006.01)
(52) U.S. Cl.
USPC .......................... 362/602; 362/97.4; 362/633
(58) Field of Classification Search
USPC .......................... 362/602, 603, 607, 97.4, 633
See application file for complete search history.

(56) References Cited

U.S. PATENT DOCUMENTS

| | | | | |
|---|---|---|---|---|
| 6,316,778 | B1 * | 11/2001 | Goodman et al. | 250/551 |
| 2007/0019275 | A1 * | 1/2007 | Okuda | 359/265 |
| 2008/0192474 | A1 * | 8/2008 | Chen et al. | 362/277 |
| 2011/0317401 | A1 * | 12/2011 | Ling et al. | 362/97.2 |
| 2013/0058127 | A1 * | 3/2013 | Huang | 362/602 |

* cited by examiner

*Primary Examiner* — Ali Alavi
(74) *Attorney, Agent, or Firm* — Altis Law Group, Inc.

(57) ABSTRACT

A computer bezel includes a bezel body, a light-guide structure mounted to the bezel body, and two light sources mounted on the bezel body. The light-guide structure includes a guiding portion and a lighting portion extending from the guiding portion. The lighting portion defines an outer surface to be exposed out of the bezel body. The guiding portion includes a bottom surface and two side surfaces. The bottom surface is connected between the two side surfaces. The guiding portion defines two cutouts recessed along the bottom surface. The two cutouts are located in the guiding portion symmetrically. Each light source corresponds to one of the two side surfaces. The guiding portion is configured to guide a plurality of light beams emitted from the two light sources to the lighting portion to enable the plurality of light beams to be refracted from the outer surface.

18 Claims, 7 Drawing Sheets

COMPUTER BEZEL WITH LIGHT-GUIDE STRUCTURE

BACKGROUND

1. Technical Field

The present disclosure relates to electronic devices, and particularly to a computer bezel with a light-guide structure.

2. Description of Related Art

Indicator lamps are often used in electronic device, such as a computer, or a testing device. The electronic device may include a panel and a circuit board, and an indicator lamp is usually secured to an outside surface of the panel. A light source is electronically connected to the circuit board. The indicator lamp and the light source may be arranged in a straight line that is substantially perpendicular to the circuit board, and light beams from the light source can be directly transmitted to the indicator lamp. However, if the indicator lamp is attached to a different location, the light beams from the light source cannot be completely transmitted to the indicator lamp. Thus, a brightness of the indicator lamp is too weak such that the indicator lamp may be nearly invisible. Therefore, an electronic device with an improved light-guide structure may be desired within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
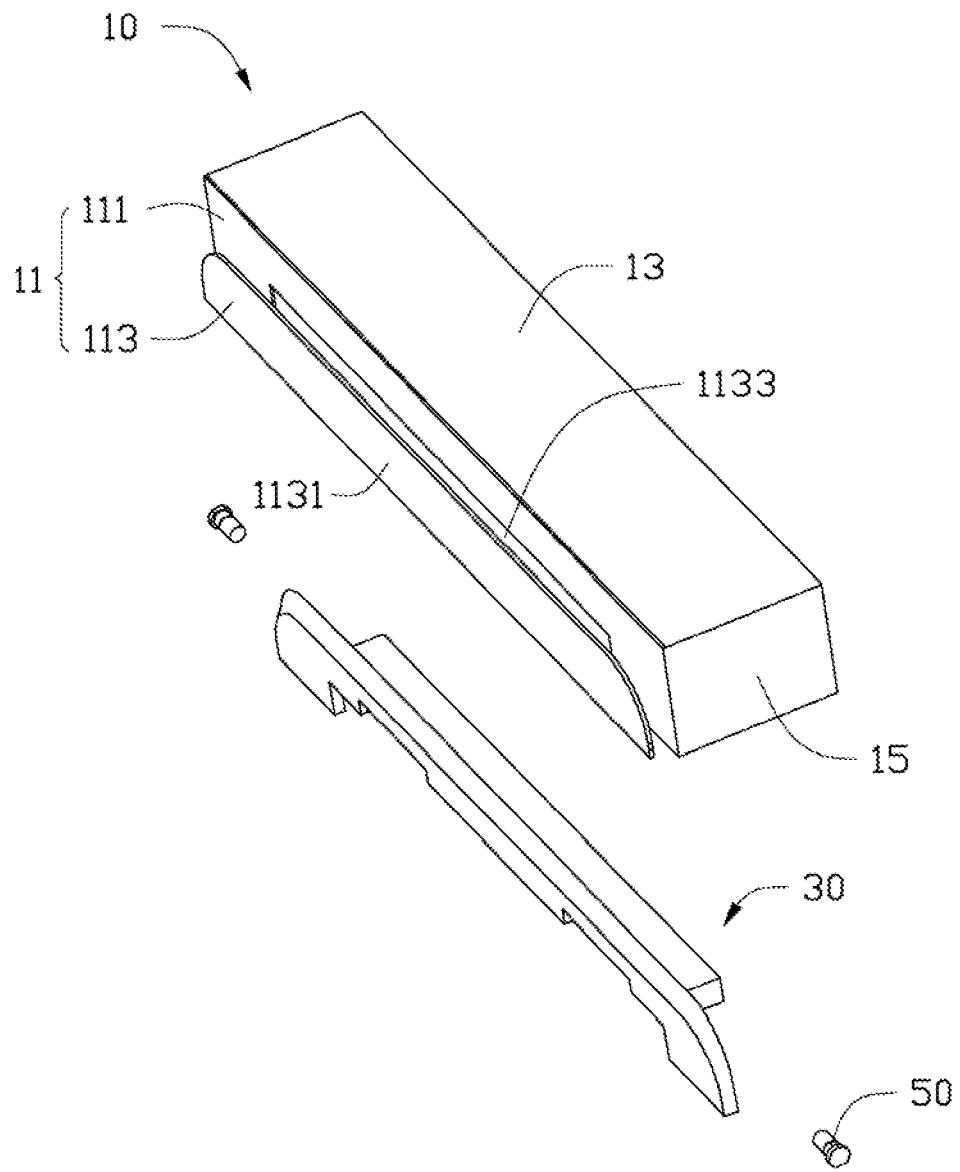
FIG. 1 is an exploded, isometric view of a computer bezel in accordance with one embodiment.

Referring to FIG. 1, a computer bezel in accordance with an exemplary embodiment includes a bezel body 10, a light-guide structure 30, and two light sources 50. In one embodiment, the two light sources 50 are two light emitting diodes (LEDs).

The bezel body 10 includes a front panel 11. The front panel 11 includes a panel body 111 and a recess portion 113 defined in the panel body 111. The recess portion 113 includes a bottom portion 1131. The bottom portion 1131 is substantially parallel to the panel body 111. The bezel body 10 further includes a top panel 13 extending from the panel body 111 and two side panels 15 extending from the panel body 111. The top panel 13 is substantially perpendicular to the panel body 111. The two side panels 15 are substantially parallel to each other and substantially perpendicular to the panel body 111.

The side panel 15 is substantially perpendicular to the top panel 13. The recess portion 113 defines an elongated opening 1133.

Figure 2:
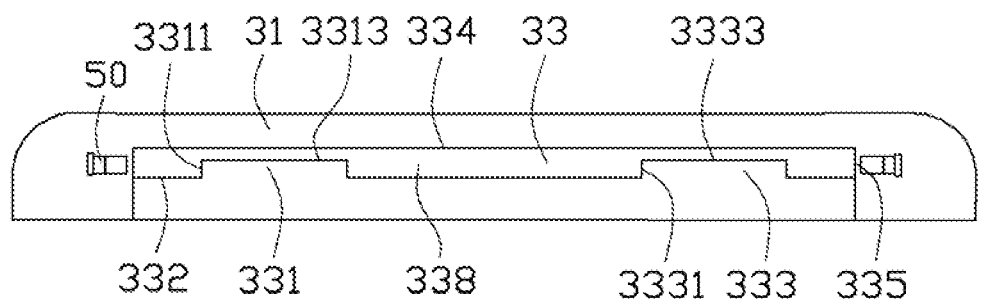
FIG. 2 is an assembled view of a light-guide structure and two light sources of FIG. 1.
Figure 3:
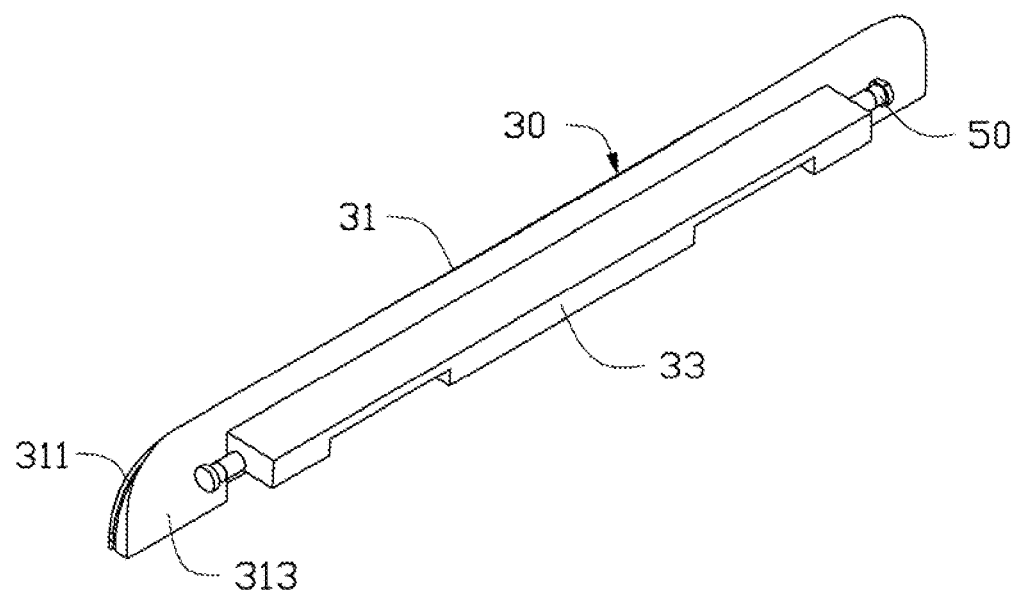
FIG. 3 is similar to FIG. 1, but viewed in another aspect.

Referring to FIGS. 2 and 3, the light-guide structure 30 includes a lighting portion 31 and a guiding portion 33 extending from the lighting portion 31. The lighting portion defines an outer surface 311. In one embodiment, the outer surface 311 is curved. The lighting portion 31 is configured to be received in the elongated opening 1133 to enable the outer surface 311 to be exposed out of the bezel body 10. The lighting portion 31 includes two end portions 313 located on opposite sides of the guiding portion 33. The guiding portion 33 is rectangular. The guiding portion 33 includes a bottom surface 332, a top surface 334 substantially parallel to the bottom surface 332, and two side surfaces 335 substantially perpendicular to the bottom surface 332. The guiding portion 33 defines a first cutout 331 and a second cutout 333 recessed along the bottom surface 332. The first cutout 331 defines two first refracting surfaces 3311, that are substantially parallel to each other, and a first connecting surface 3313 connected to the two first refracting surfaces 3311. The connecting surface 3313 is substantially perpendicular to the first refracting surface 3311. The second cutout 333 defines two second refracting surfaces 3331 substantially parallel to each other and a second connecting surface 3333 connected between the two second refracting surfaces 3331. The first cutout 331 and the second cutout 333 are substantially the same size and located in the guiding portion 33 symmetrically.

Figure 4:
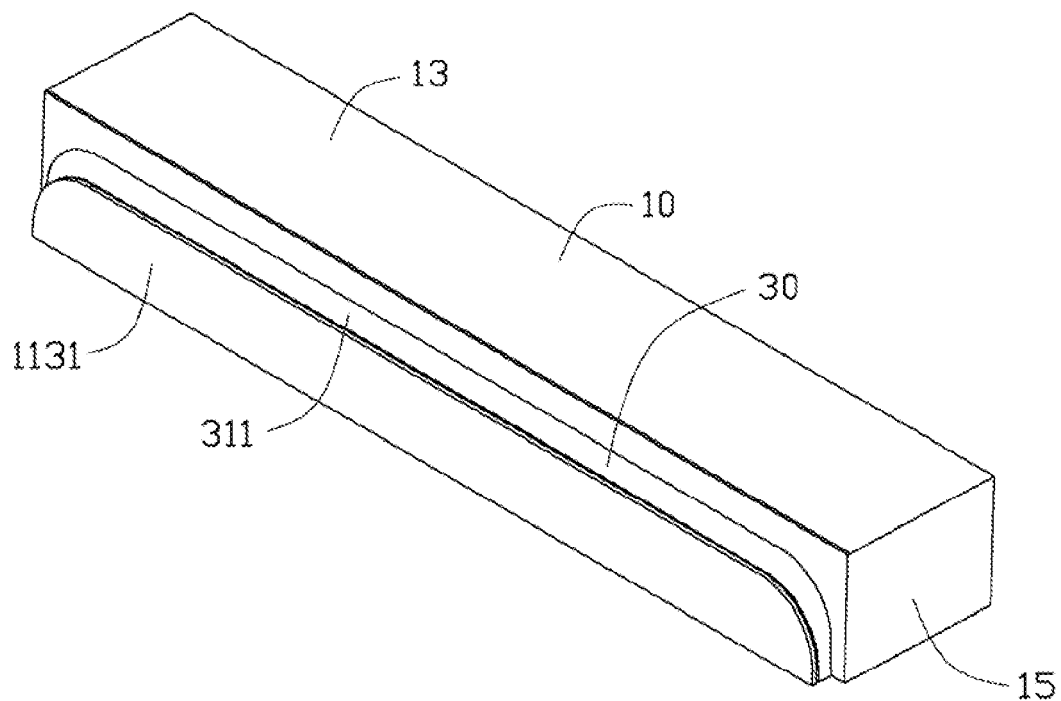
FIG. 4 is an assembled view of FIG. 1.
Figure 5:
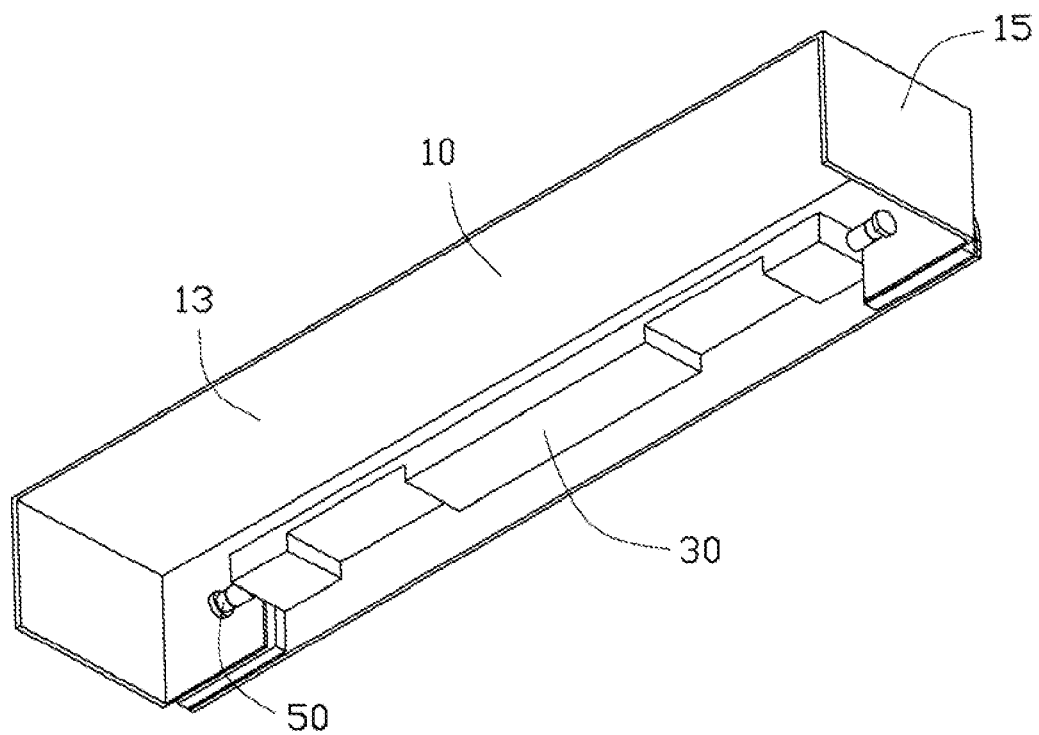
FIG. 5 is similar to FIG. 4, but viewed in another aspect.

Referring to FIGS. 4 and 5, in assembly, the lighting portion 31 of the light-guide structure 30 is received in the elongated opening 1133. The outer surface 311 is exposed out of the bezel body 10. At this time, the two end portions 313 are located between the panel body 111 and the bottom plate 1131. The two light sources 50 are mounted on the bezel body 10 and/or adjacent to the two side surfaces 335 of the guiding portion 33.

Figure 6:
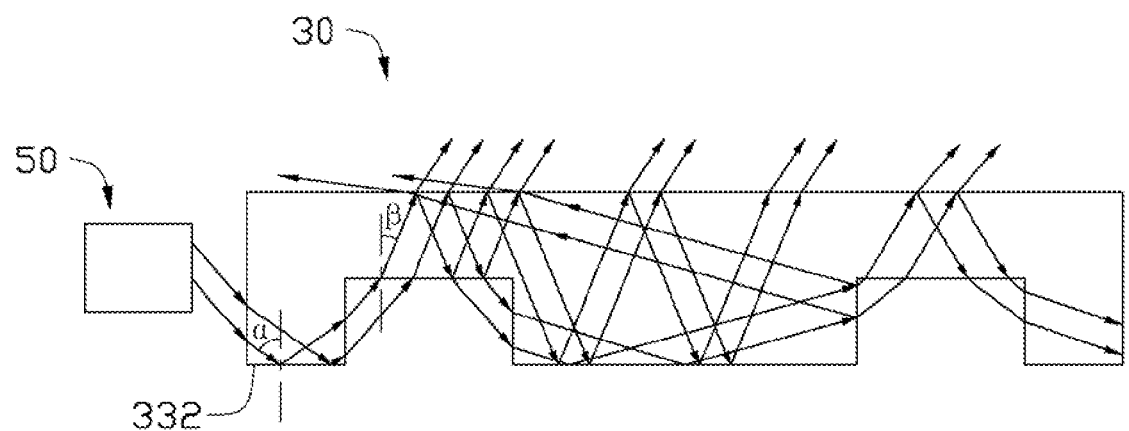
FIG. 6 is an assembled view of the light-guide structure and the light source of FIG. 1.

Referring to FIG. 6, in use, a plurality of light beams are emitted from one of the two light sources 50. The incident angle of the plurality of light beams is a. The incident angle of the plurality of light beams is β after the plurality of light beams is refracted by the first refracting surface 3311 and the first connecting surface. β is less than α.

Figure 7:
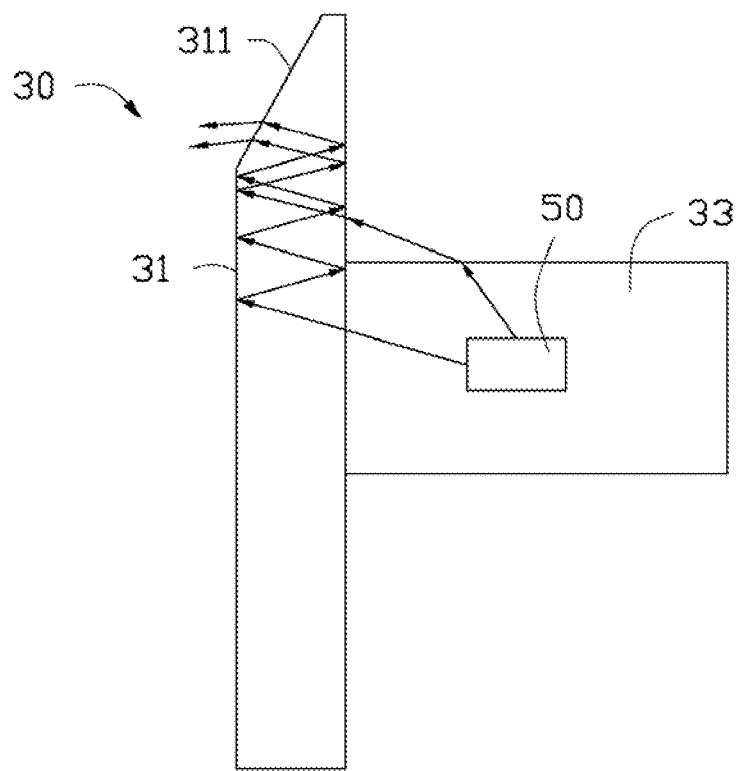
FIG. 7 is similar to FIG. 6, but viewed in another aspect.

Referring to FIG. 7, the light beams on top surface 334 refract into the lighting portion 31. The first light beams are emitted into the lighting portion 31 via the reflection of the bottom surface 332 of the guiding portion 33. The second light beams are refracted from the outer surface 311.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer bezel comprising:
   a bezel body;
   a light-guide structure mounted to the bezel body, the light-guide structure comprising a guiding portion and a lighting portion, extending from the guiding portion; the lighting portion defines an outer surface to be exposed out of the bezel body; the guiding portion comprises a bottom surface and two side surfaces; the bottom surface connected to the two side surfaces; the guiding portion defining two cutouts recessed along the bottom surface; and the two cutouts located in the guiding portion symmetrically; and two light sources mounted on the bezel body; and each light source corresponds to one of the two side surfaces;

wherein the guiding portion is configured to guide a plurality of light beams emitted from the two light sources to the lighting portion to enable the plurality of light beams to be refracted from the outer surface.

2. The computer bezel of claim 1, wherein each cutout defines two refracting surfaces and a connecting surface, connected to the two refracting surfaces; and the two refracting surfaces are substantially parallel to each other and substantially perpendicular to the bottom surface.

3. The computer bezel of claim 2, wherein the connecting surface is substantially parallel to the bottom surface.

4. The computer bezel of claim 1, wherein each of the two side surfaces is substantially perpendicular to the bottom surface.

5. The computer bezel of claim 1, wherein the bezel body comprises a panel body and a recess portion formed in the panel body; the recess portion comprises a bottom portion; the recess portion defines an elongated opening located between the bottom portion and the panel body; and the lighting portion is located in the elongated opening to enable the outer surface to be exposed out of the bezel body.

6. The computer bezel of claim 5, wherein the bottom portion is substantially parallel to the panel body.

7. The computer bezel of claim 5, wherein the lighting portion comprises two end portions located on opposite sides of the guiding portion; and the two end portions are located between the bottom portion and the panel body.

8. The computer bezel of claim 5, wherein the bezel body further comprises a top panel extending from the panel body and two side panels extending from the panel body; the top panel is substantially perpendicular to the panel body; and the two side panels are substantially perpendicular to the panel body.

9. The computer bezel of claim 8, wherein the two side panels are substantially parallel to each other and substantially perpendicular to the top panel.

10. A computer bezel comprising:

a bezel body, the bezel body comprising a panel body and a recess portion defined in the panel body; and the recess portion defines an elongated opening;

a light-guide structure mounted to the bezel body, the light-guide structure comprising a guiding portion and a lighting portion extending from the guiding portion; the lighting portion defines an outer surface; the lighting portion is received in the elongated opening to enable the outer surface to be exposed out of the bezel body; the guiding portion comprises a bottom surface and two side surfaces; the bottom surface connected to the two side surfaces; the bottom surface is substantially parallel to the panel body; the guiding portion defines two cutouts recessed along the bottom surface; the two cutouts are located in the guiding portion symmetrically; and two light sources mounted on the bezel body; each light source corresponds to one of the two side surfaces; and the light-guide structure is located between the two light sources;

wherein the guiding portion is configured to guide a plurality of light beams emitted from the two light sources to the lighting portion to enable the plurality of light beams to be refracted from the outer surface.

11. The computer bezel of claim 10, wherein each cutout defines two refracting surfaces and a connecting surface connected between the two refracting surfaces; and the two refracting surfaces are substantially parallel to each other and substantially perpendicular to the bottom surface.

12. The computer bezel of claim 11, wherein the connecting surface is substantially parallel to the bottom surface.

13. The computer bezel of claim 10, wherein each of the two side surfaces is substantially perpendicular to the bottom surface.

14. The computer bezel of claim 10, wherein the recess portion comprises a bottom portion; the elongated opening is located between the bottom portion and the panel body.

15. The computer bezel of claim 14, wherein the bottom portion is substantially parallel to the panel body.

16. The computer bezel of claim 15, wherein the lighting portion comprises two end portions located on opposite sides of the guiding portion; and the two end portions are located between the bottom portion and the panel body.

17. The computer bezel of claim 10, wherein the bezel body further comprises a top panel extending from the panel body and two side panels extending from the panel body; the top panel is substantially perpendicular to the panel body; and the two side panels are substantially perpendicular to the panel body.

18. The computer bezel of claim 17, wherein the two side panels are substantially parallel to each other and substantially perpendicular to the top panel.

* * * * *